United States Patent [19]

Nilsson et al.

[11] Patent Number: 5,411,241
[45] Date of Patent: * May 2, 1995

[54] CONTROL VALVE FOR A FAUCET AND USE OF ULTRASONIC MOTOR

[75] Inventors: Pekka W. Nilsson, Rauma; Risto A. Saarisalo, Ruona, both of Finland

[73] Assignee: Oras Oy, Rauma, Finland

[*] Notice: The portion of the term of this patent subsequent to Aug. 2, 2010 has been disclaimed.

[21] Appl. No.: 689,868

[22] PCT Filed: Jan. 10, 1990

[86] PCT No.: PCT/FI90/00009
§ 371 Date: Aug. 23, 1991
§ 102(e) Date: Aug. 23, 1991

[87] PCT Pub. No.: WO90/08283
PCT Pub. Date: Jul. 26, 1990

[30] Foreign Application Priority Data

Jan. 11, 1989 [FI] Finland ............................ 890138
Jan. 10, 1990 [FI] Finland ............................ 893764

[51] Int. Cl.[6] ............................................. F16K 31/02
[52] U.S. Cl. ........................... 251/129.06; 251/129.11
[58] Field of Search .................... 310/323; 251/129.06, 251/129.11

[56] References Cited

U.S. PATENT DOCUMENTS

| | | | |
|---|---|---|---|
| 4,556,193 | 12/1985 | Yoshiga | 251/129.11 |
| 4,700,885 | 10/1987 | Knebel | 251/129.11 X |
| 4,741,416 | 5/1988 | Tanigawa | 188/299 |
| 4,743,791 | 5/1988 | Kawai | 310/323 |
| 4,750,706 | 6/1988 | Schlagmuller | 251/129.06 |
| 4,793,689 | 12/1988 | Aoyagi et al. | 310/323 X |
| 5,726,453 | 2/1988 | Obstfelder et al. | 251/129.09 X |

*Primary Examiner*—William E. Tapolcai
*Attorney, Agent, or Firm*—McAulay Fisher Nissen Goldberg & Kiel

[57] ABSTRACT

The invention relates to a motor-driven control valve for a liquid, in which a control member (31) effects a rotatory and/or linear motion. In order to achieve an improved torsion moment and controllability, the motion of the control member is produced by means of an ultrasonic motor. In one embodiment, the rotating plate acting as a control member (31) forms directly a mobile part of the ultrasonic motor. An oscillating body (36) is in contact with this part, the oscillations of the body being produced by piezoelectric elements (37). The oscillating body (36) with the piezoelectric elements (37) can be annular, thus surrounding e.g. the material flowing in the pipe. Owing to the invention, a compact and simple solution is provided, and the actuating of the plate does not require as many transmission elements as when usual electric motors are being used.

6 Claims, 12 Drawing Sheets

CONTROL VALVE FOR A FAUCET AND USE OF ULTRASONIC MOTOR

The present invention relates to a control valve for a faucet, in which the control member effects a circular or linear motion. The invention also relates to a new implementation of the so-called ultrasonic motor for the control of the valve of a faucet.

It is known to guide the valves of faucets and thermostats with electric motors and solenoids. Solenoids merely control the closing and opening action, whereas a motor enables to control the valve as desired and for instance also a mixing valve provided with a thermostat or without it.

For this purpose direct-current motors have been used, having a relatively large range of control and also providing an easy reversal; a stepping motor can also be used. Prior known motor-driven valves have the drawback of the relatively high operating speed of the motor and a poor torsional moment; for this reason a gear reducer comprising several gearwheels has to be used inbetween. The relatively great size of the motor is of course a problem.

The purpose of the present invention is to eliminate these drawbacks and to provide a motor drive for the control valve of a faucet that reduces the size and need for a reducing gear and requires a relatively small space. In order to achive this, the control valve of the invention is characterized by the fact that the motion of the control member is generated by means of an ultrasonic motor.

A special application of an ultrasonic motor to the control of a valve has been previously disclosed by the U.S. Pat. No. 4,741,416. It describes the control of the damping degree of a shock damper by means of an ultrasonic motor. The actual control valve is not described in the specification, but the control member is affected by the motor shaft. Some principles for ultrasonic motors could appropriately be explained in this connection.

The most common type of ultrasonic motors comprises an annular oscillating metal stator, the oscillation of which is produced by successive piezoelectric elements attached to the surface of the ring, to which sine-wave voltages are alternately conducted, the voltages being in a 90° phase displacement to each other. When another ring or plate is pressed against the oscillating ring, the oscillating ring brings the superposed plate or ring into a rotatory motion. By means of the voltage intensity the rate of the rotatory motion can be controlled, and by means of voltage phasing the rotating direction can be controlled. In most cases, a friction layer improving the adherence is interposed between the oscillating ring and the rotating plate. We refer to the patent application GB 2 120 462.

In a slightly altered version, the ring consisting of piezoelectric elements surrounds an inner metal ring, which forms the oscillating body and inside which an element intended to be rotated has been disposed. This has also been described in the GB patent application 2 120 462.

The oscillating body can also be shaped as a longitudinal straight body, producing a linear motion instead of the rotatory motion.

In a slightly different type, the piezoelectric elements have been pressed between two cylindrical (aluminium) pieces, a slotted piece having additionally been pressed against one of these. The slotted piece brings the counter-piece bearing against it with string force into a rotatory motion. We refer for instance to the EP patent application 86 102 249.9 ((publication nr. 198 183).

According to a preferred embodiment of the invention, the outlet shaft of the ultrasonic motor rotates the spindle of the controlling member over the tooth gear. Thus, e.g. the motor of an ultrasonic motor can be equipped with an inner tooth rim and one or more tooth wheels mounted rotatorily on bearings in the body of the control valve can be interposed between the said tooth rim and the dented spindle of the valve member.

For instance, by means of two identical motors, the cold and hot water control valve of a mixer can be adjusted over a common control unit. Thus, the control unit most appropriately receives its adjusting instructions from a temperature sensor placed in the mixed water.

When the valve member consists of a rotating plate, each respective position of which determines the flow-through opening of the valve, a specially advantageous compact construction is obtained according to the invention in that the rotating plate or a part immediately attached to it forms a mobile counter-part of the ultrasonic motor, which is pressed by means of piezoelectric elements against the oscillating body brought into oscillation.

In a preferred embodiment, the oscillating body of the ultrasonic motor is annular and placed so as to surround the material flow.

When the rotating plate is disposed together with the solid plate inside the pipe, the oscillating body is placed either inside the pipe next to the wall or in some cases it can be part of the wall itself. In the latter cases, the piezoelectric elements have to be disposed outside the pipe wall.

The invention and its other features and advantages are described in greater detail below in the form of examples and referring to the enclosed drawings, in which.

Figure 1:
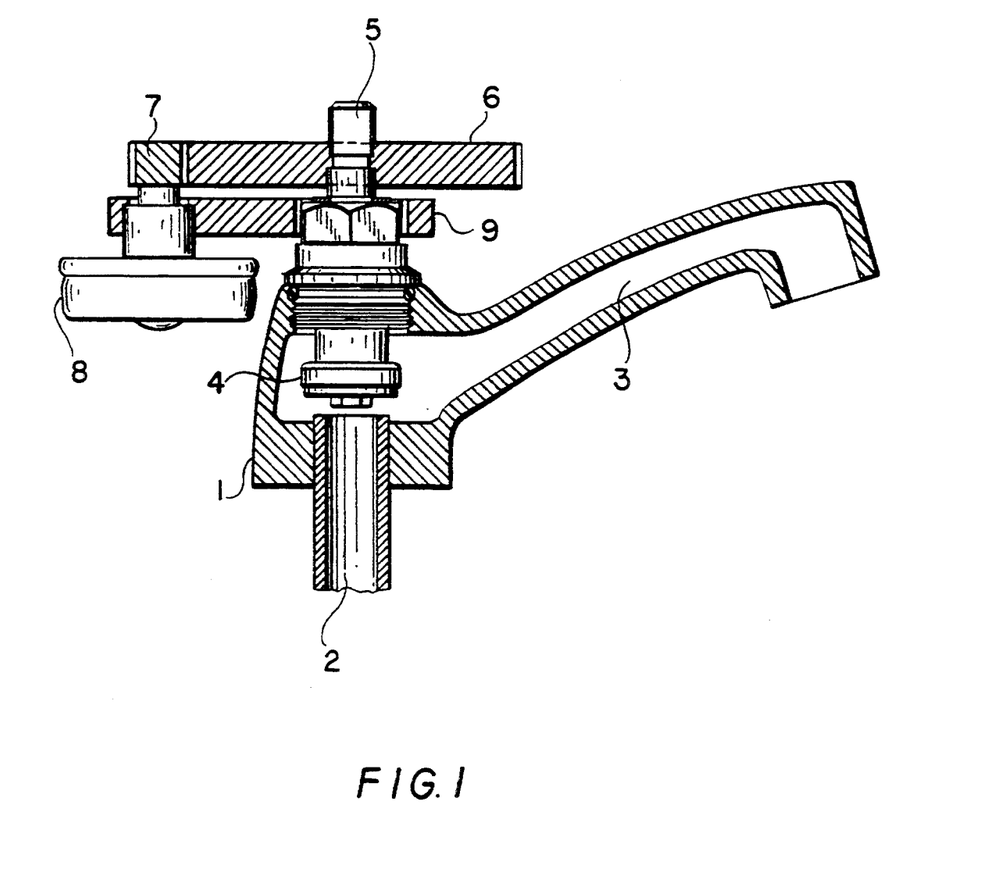
FIG. 1 shows a lateral view and a partial section of a faucet equipped wtih a control valve according to the invention.

In FIG. 1 the faucet body is indicated by 1, number 2 denotes the water supply pipe and reference 3 the water outlet pipe.

In this case the control member is represented by the valve disc 4, which tightens the supply pipe 2 against the end surface. Owing to a spiral arrangement, the rotational motion of the spindle 5 produces the axial motion of the disc 4, i.e. the operation of the valve. To the spindle 5 a tooth wheel 6 is attached, which is rotated by the tooth wheel 7 attached on the shaft of the ultrasonic motor 8.

Figure 1A:
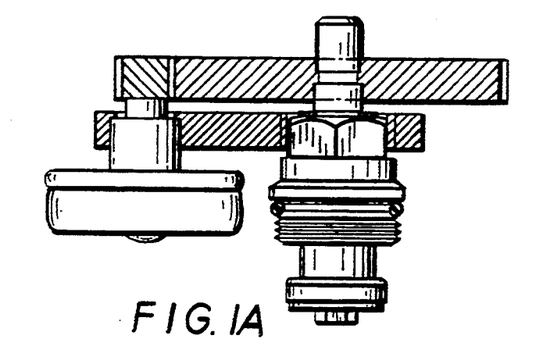
FIGS. 1a–1c show optional embodiments of the control valve of the faucet of FIG. 1.
Figure 1B:
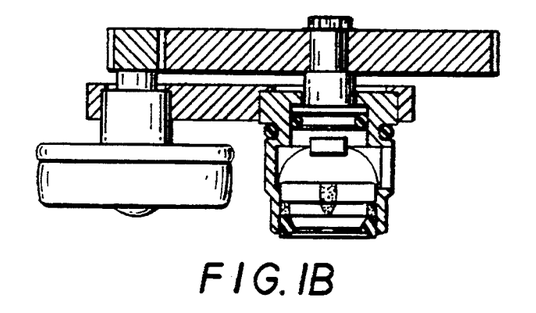
Figure 1C:
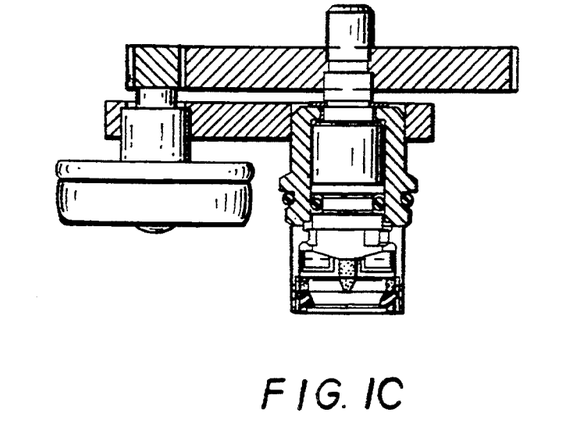

FIGS. 1a–1c show slighty optional embodiments of a control valve, FIG. 1a corresponding to FIG. 1 and FIGS. 1b and 1c differing from this with regard to the control member.

Figure 2:
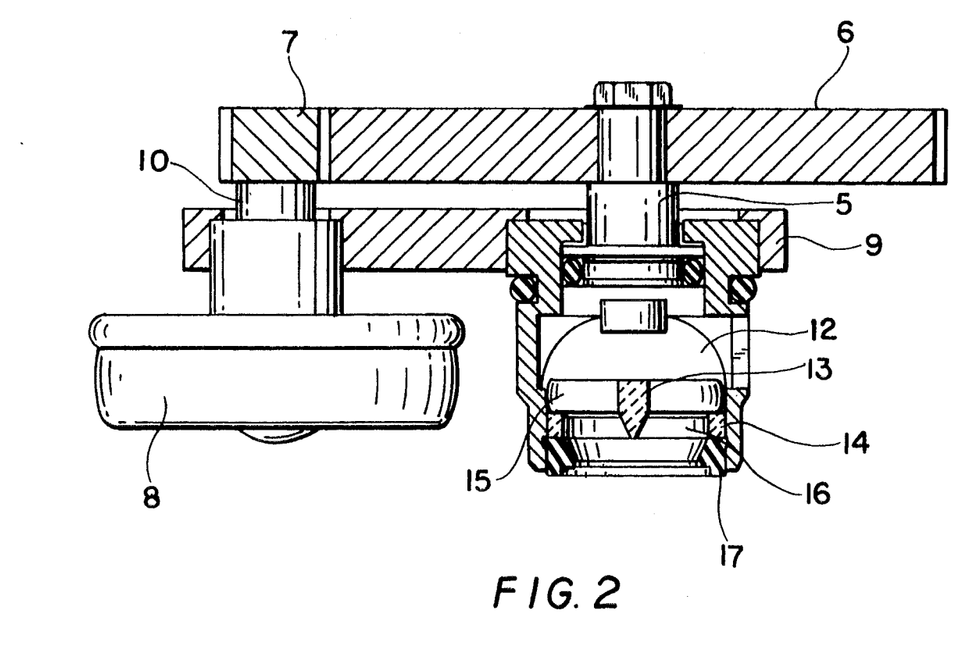
FIG. 2 shows the embodiment of FIG. 1b on a larger scale.
Figure 2A:
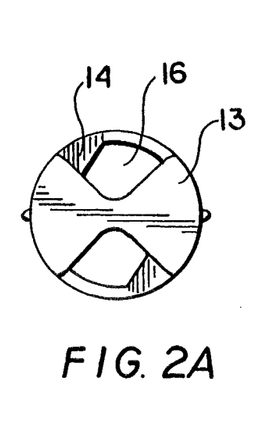
FIG. 2a shows a top view of the part of FIG. 2.

FIG. 2 corresponds to FIG. 1b, but is presented on a larger scale. The reference number 10 indicates the shaft of the ultrasonic motor 8. Parts 12–17, which differ from FIG. 1 are: 12 is the water flowing space, the upper surface of which has been curved. 13 is a mobile ceramic plate, turning by means of the spindle 5, which cooperates with the solid ceramic plate 14, 15 is the opening of the plate 13 and 16 the opening of the plate 14. 17 is a a gasket ring. The water supply and discharge opening is adjusted in a manner known per se by turning the plate 13 (cf. also FIG. 2a).

Figure 3:
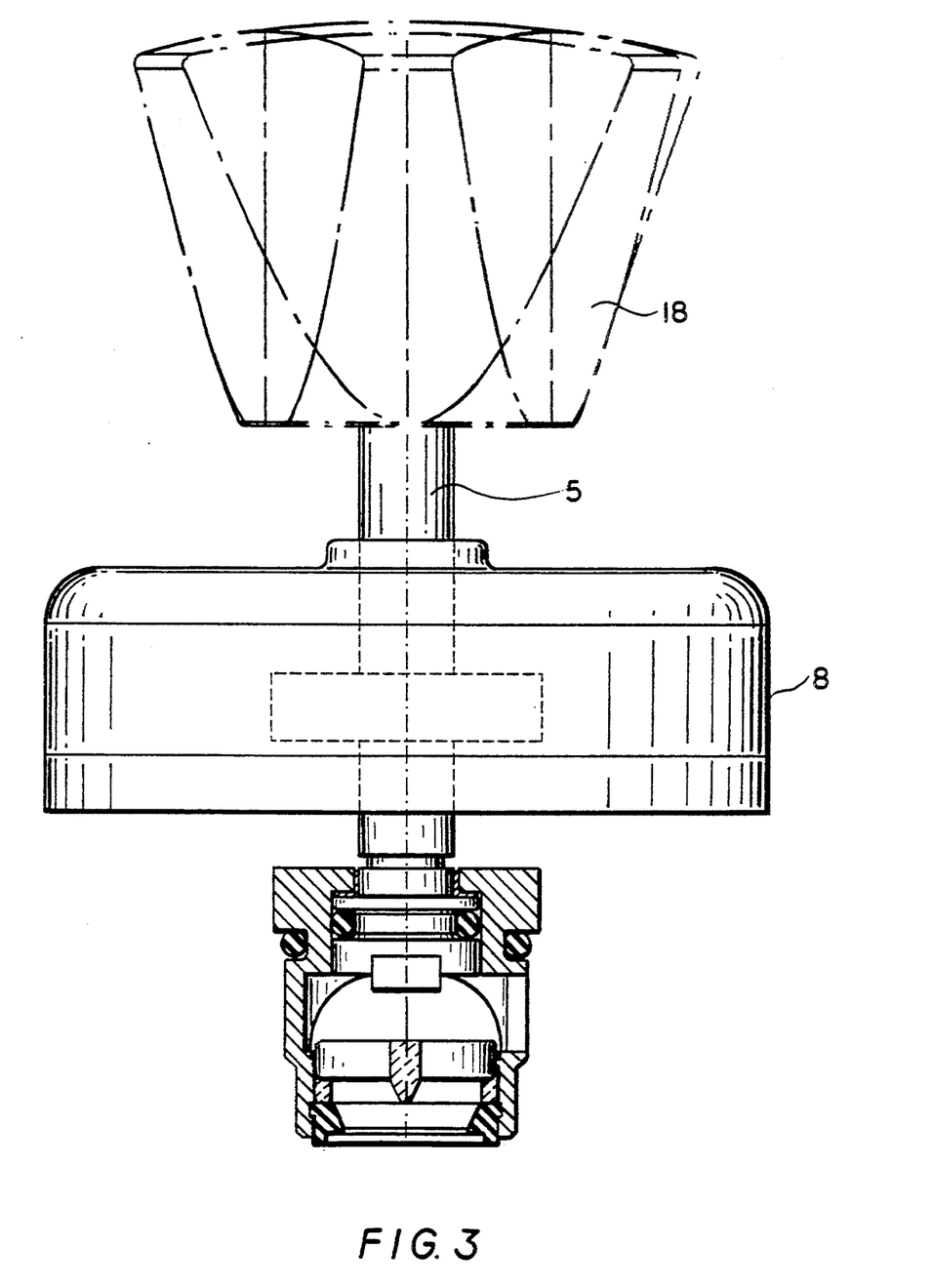
FIG. 3 shows the control valve according to the invention comprising also a manual control.

FIG. 3 shows a control valve according to the invention, in which the spindle 5 of the valve member is additionally equipped with a handle 18 for manual control.

Figure 4:
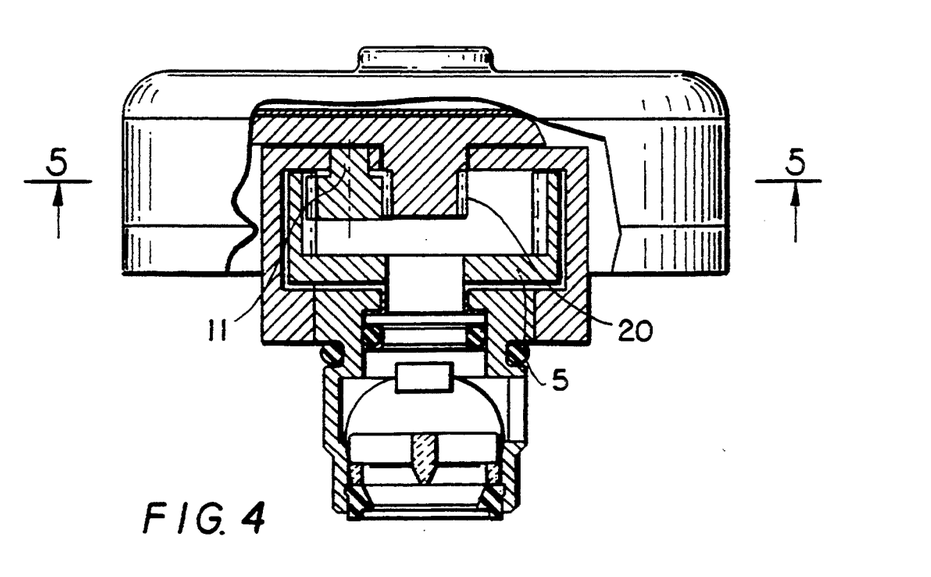
FIG. 4 shows an optional embodiment of the control motor compared to FIG. 1.
Figure 5:
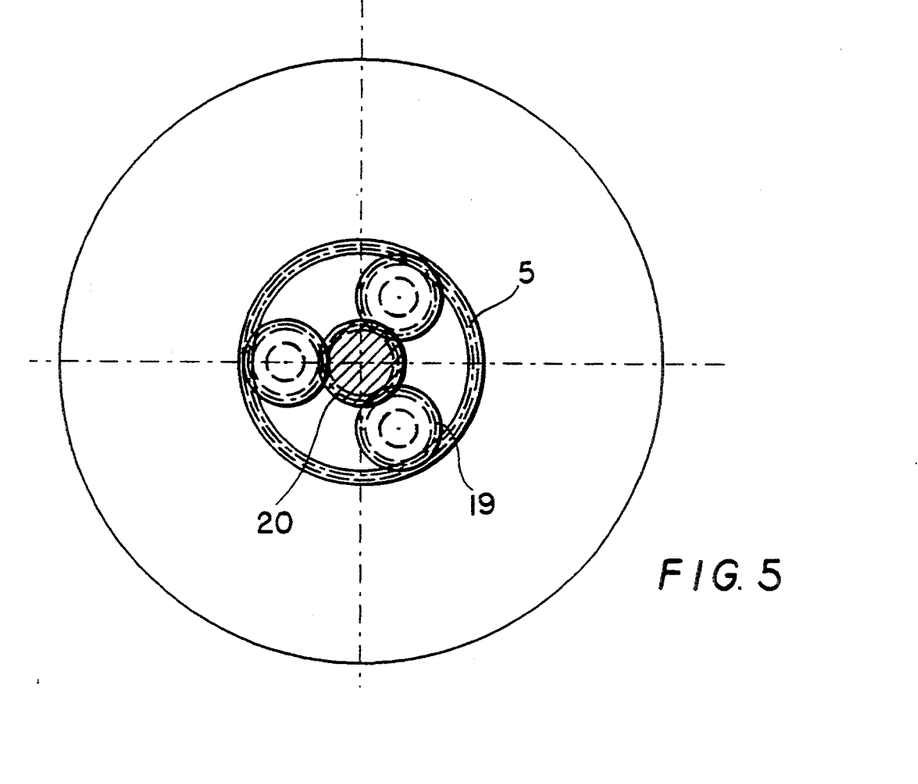
FIG. 5 shows a section along the line A—A of FIG. 4.

FIGS. 4 and 5 show a slightly optional embodiment. The ultrasonic motor 8 is provided with a rotor, comprising a dented shaft 20. The motor is centrally disposed on top of a sleeve-like internally dented spindle 5 so that the sleeve 5 surrounds the shaft 20. To the valve body are attached vertical shafts 11, onto which the tooth wheels 19 touching the shaft 20 and the toothing of the spindle 5 have been mounted, thus generating a reduction gear between the shaft 20 and the spindle 5.

Figure 6:
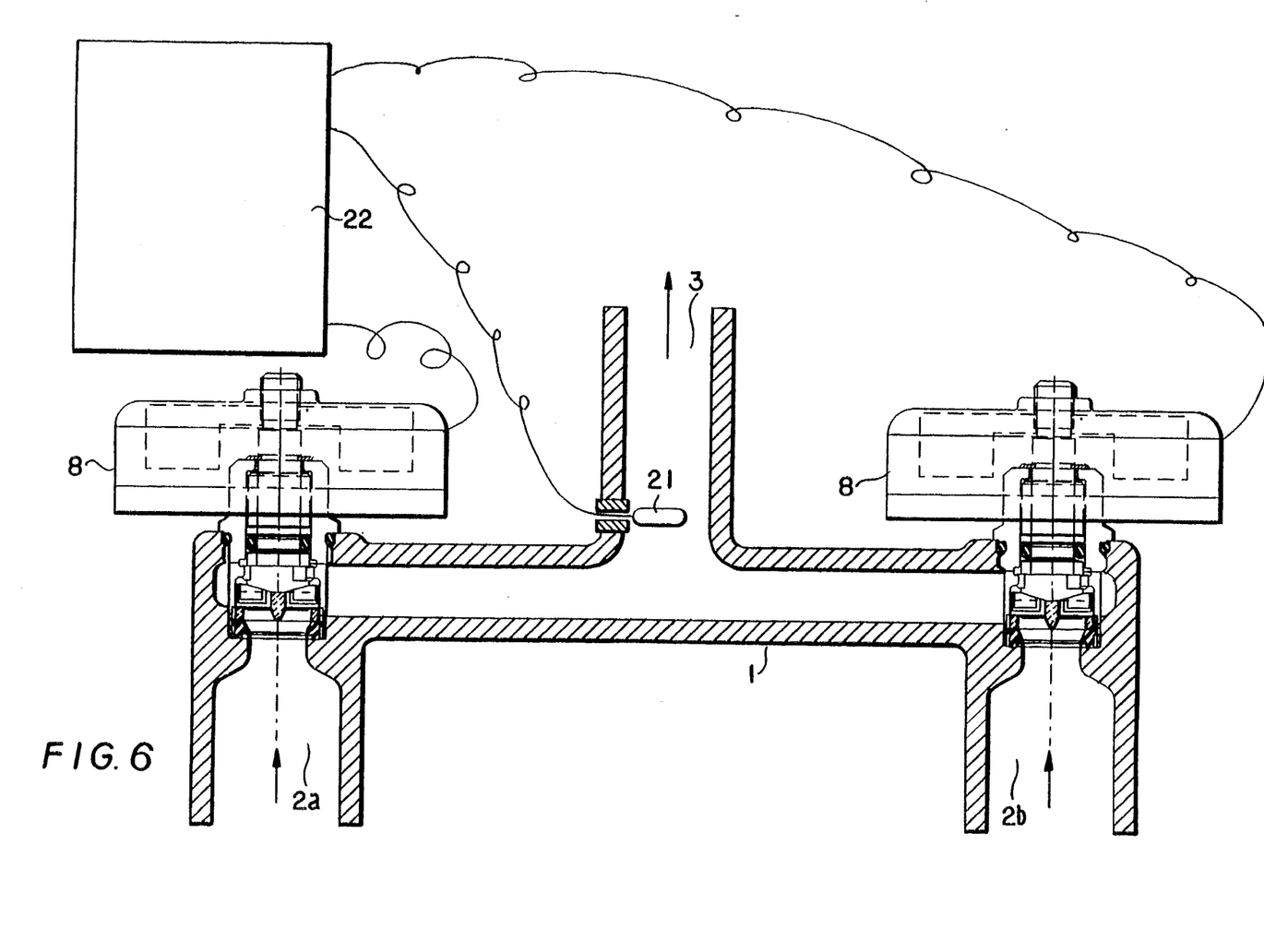
FIG. 6 shows two control valves according to the invention used in a mixing faucet.

FIG. 6 shows a mixer equipped with control valves according to the invention. Reference 2a denotes the cold water supply pipe and reference 2b the hot water supply pipe. The amount of both cold and hot water are controlled by a control valve realized with ceramic plates and adjusted by the utrasonic motor 8. The motors 8 are connected to the electronic regulating unit 22, which again receives its command signal from a temperature sensor 21 placed in the output pipe 3 of the mixed water.

Figure 7:
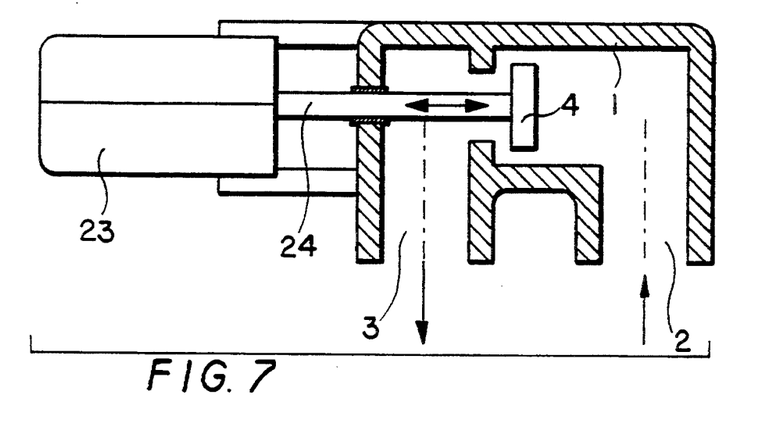
FIG. 7 shows a closing valve, in which the control member is actuated by a linear motor.
Figure 8:
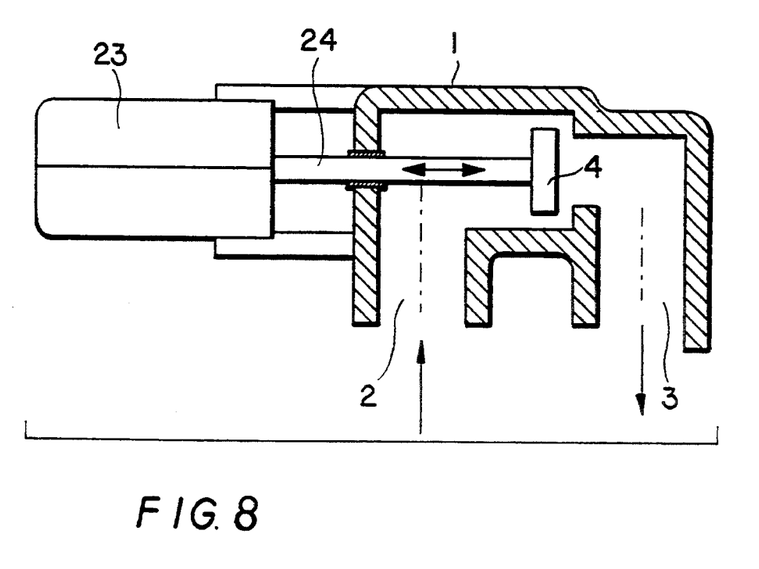
FIG. 8 shows an optional solution for FIG. 7.
Figure 9:
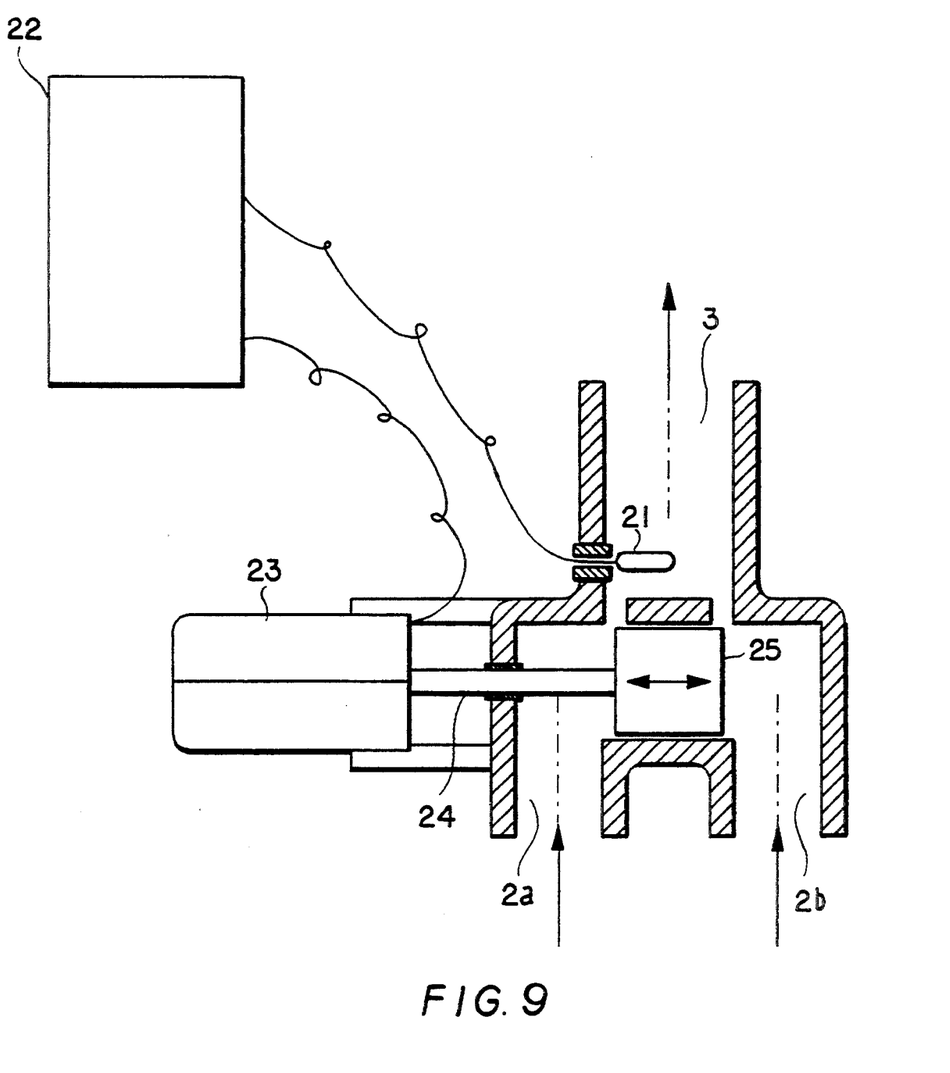
FIG. 9 shows a mixing valve equipped with a control valve according to the invention.

FIGS. 7–9 show control valve solutions, in which the motion of the starting shaft 24 of the ultrasonic motor is linear and not rotating. We refer to the operation principle of the ultrasonic motor described above.

In FIGS. 7 and 8 the valve disc 4 attached to the spindle of the motor closes the water supply each time from the side of the supply pipe 2. In the figures only the water supply pipe 2 resp. outlet pipe 3 are disposed on different sides.

FIG. 9 shows a mixing valve, in which the mixing amounts of cold and hot water are controlled by one single piston-like control member 25 attached to the spindle of the linear motor. The motor is guided by the control unit 22 with the aid of a temperature signal received from a temperature sensor 21. It is obvious that a separate control member of the total water amount is needed, which is not represented in this figure.

Figure 10:
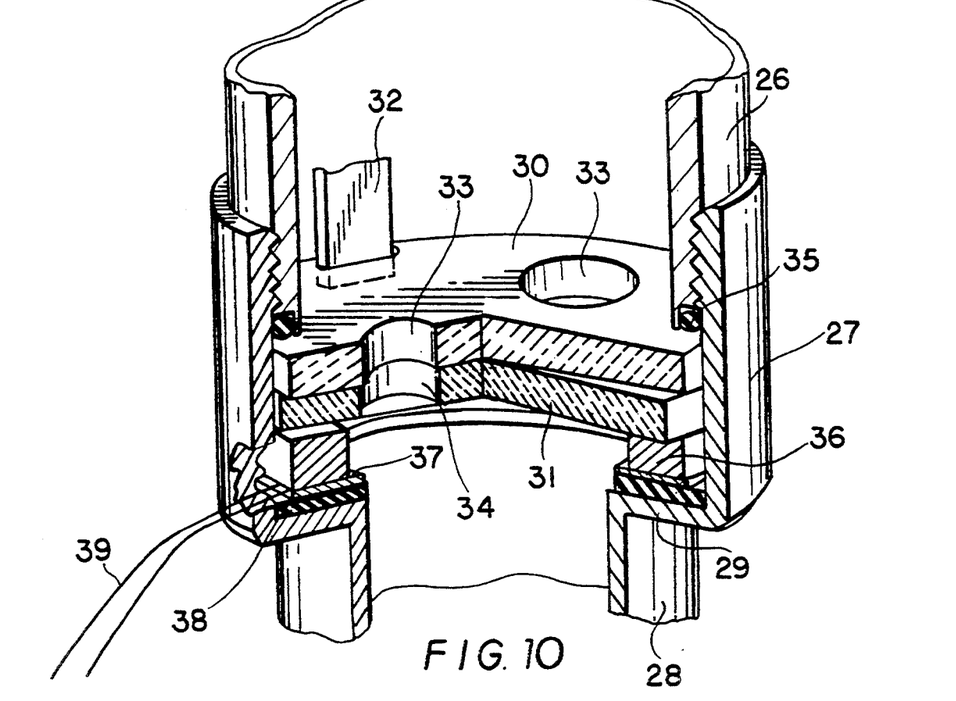
FIG. 10 shows a perspective view and a partial section of one embodiment of the valve according to the invention.

In FIG. 10 showing the construction of the integrated ultrasonic motor and the valve, reference number 26 indicates a cylindrical pipe portion, which by spiral fitting is connected to a second pipe portion 27, which is equipped with a shoulder 29 so as to continue as a thinner pipe 28.

Reference numbers 30 and 31 indicate two ceramic plates, which are equipped with cooperating penetrating holes 33 and 34, the plate 30 being stationary and the plate 31 rotating so that the size of the pass-through opening of the holes 33 and 34 is determined by the position of the plate 31 in a manner that has already been well known in connection with water fittings.

Reference number 32 indicates only a cog that adheres to the slot of the plate 30 and prevents this from rotating.

In this case, the ultrasonic motor consists of the following parts; a ring formed by the alternating piezoelectric elements 37, the annular oscillating body 36 and a mobile part pressed against the latter, consisting in this case of the mobile plate 31. The ultrasonic motor is connected to an alternating voltage source by the wires 39. In reality, two sine voltages in mutual phase displacement are conducted to the alternating piezoelectric elements, as it is explained in greater detail in the specifications describing these motors.

The entire valve assembly, i.e. the piezoelectric elements 37, the oscillating ring 36 and the ceramic plates 30 and 31 are sealed with regard to the pipe 26 by an O-ring 35 and with regard to the shoulder 29 with a gasket ring 38.

Essential in the invention is thus the utilization of the principle of the ultrasonic motor so that the valve member, i.e. the mobile plate 31 can directly form a mobile part of the motor. The same effect is naturally achieved if the mobile part consists of a ring as normally, which is then immediately attached to a ceramic plate. A friction layer can be comprised between the oscillating body 36 and the mobile plate 31 in a manner known from ultrasonic motors, not shown in FIG. 10.

Figure 11:
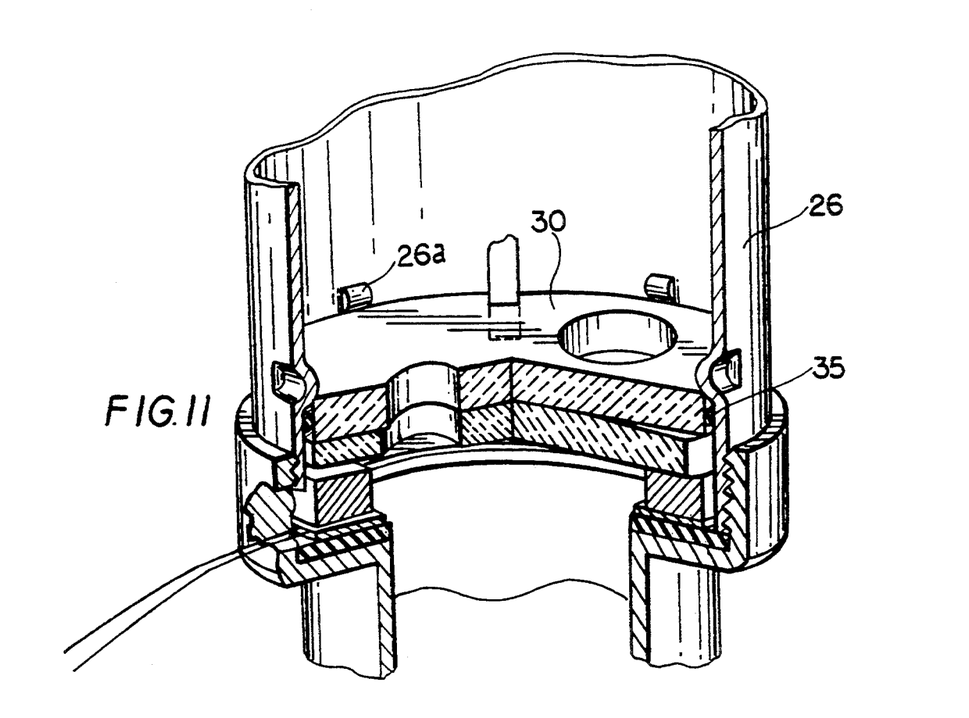
FIG. 11 shows an embodiment differing only slightly from the one of FIG. 10.

FIG. 11 shows a solution that is in principle identical to the one of FIG. 10, with the only difference that the stop face retaining the plate assembly has been produced by the press-buttons 26a of the pipe 26, and the solid plate 30 has been sealed on its circumference with the O-ring 35. Otherwise the construction is the same as in FIG. 10.

Figure 12:
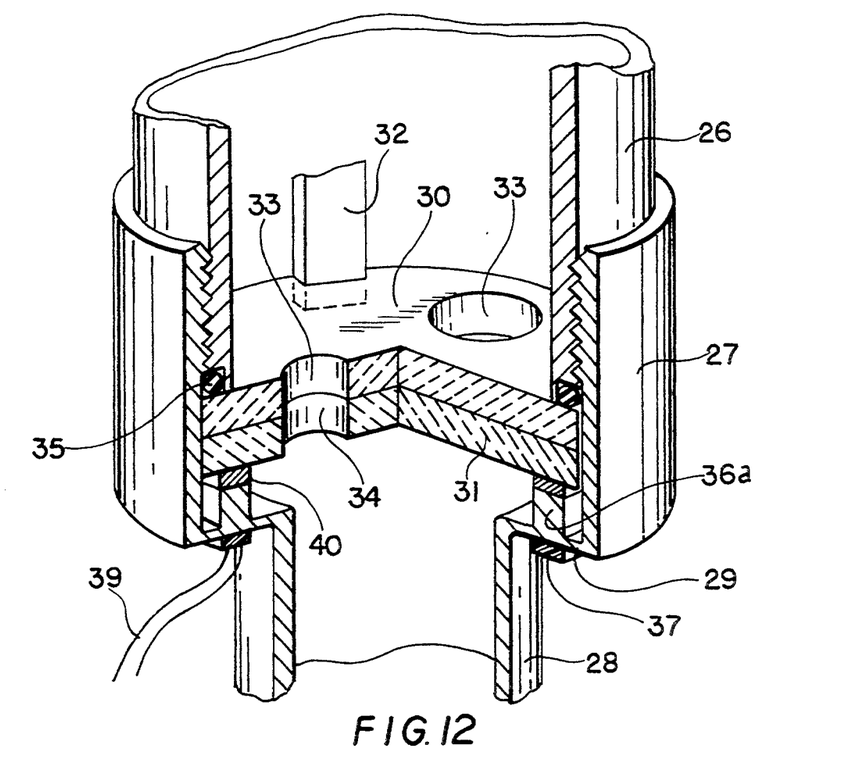
FIG. 12 shows a slightly modified embodiment, also as a perspective view and partial section.

FIG. 12 differs from the above in that the oscillating body i.e. the ring has been realized as an integrated part 36a of the pipe wall, more precisely of the shoulder 29. The piezoelectric elements 37 are disposed successively as a ring below the shoulder 29, that is outside the pipe.

The oscillation then has to pass through the pipe wall, that is to say that the shoulder 29 has to be reduced on both sides of the oscillating ring 36a.

FIG. 12 also presents the friction layer 40 mentioned when speaking of FIG. 10 above, interposed between the oscillating body 36a and the mobile plate 31.

Figure 13:
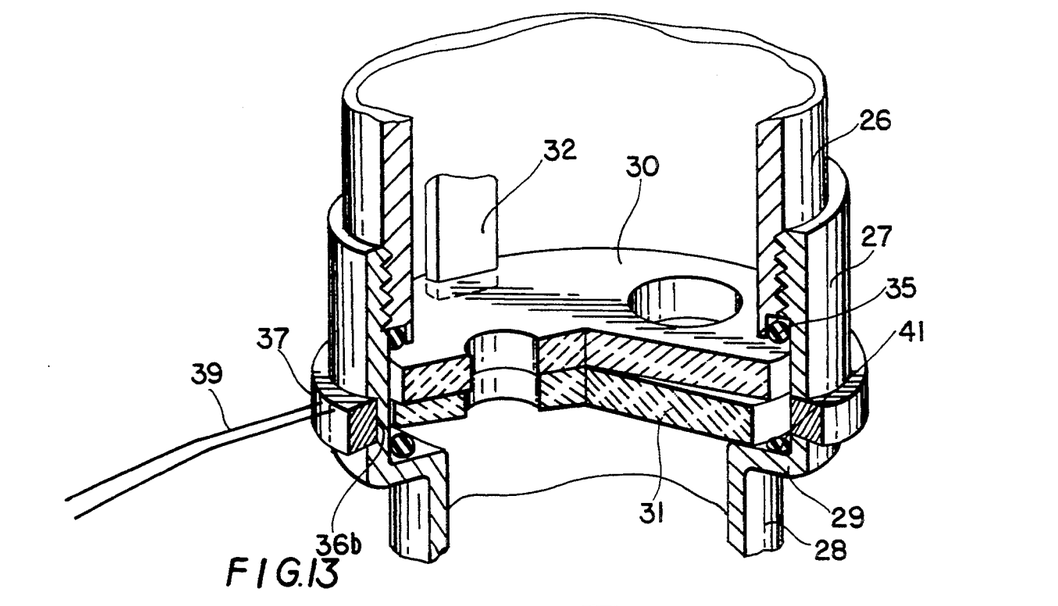
FIG. 13 shows a further option of the embodiment of FIG. 10.

FIG. 13 shows an optional embodiment, in which the piezoelectric elements have been formed as a ring 37 outside the pipe 27, surrounding the pipe. The wall of the pipe 27 has been reduced at the point of the ring 37, so that the wall itself forms the oscillating body 36b. In this case it might be necessary to make the pipe thinner over a greater distance than only the width of the ring 37, for the oscillations to pass through the wall and to bring the plate 31 into a rotatory motion.

The plate assembly has been sealed with regard to the pipeage with O-rings 35 and 41.

Figure 14:
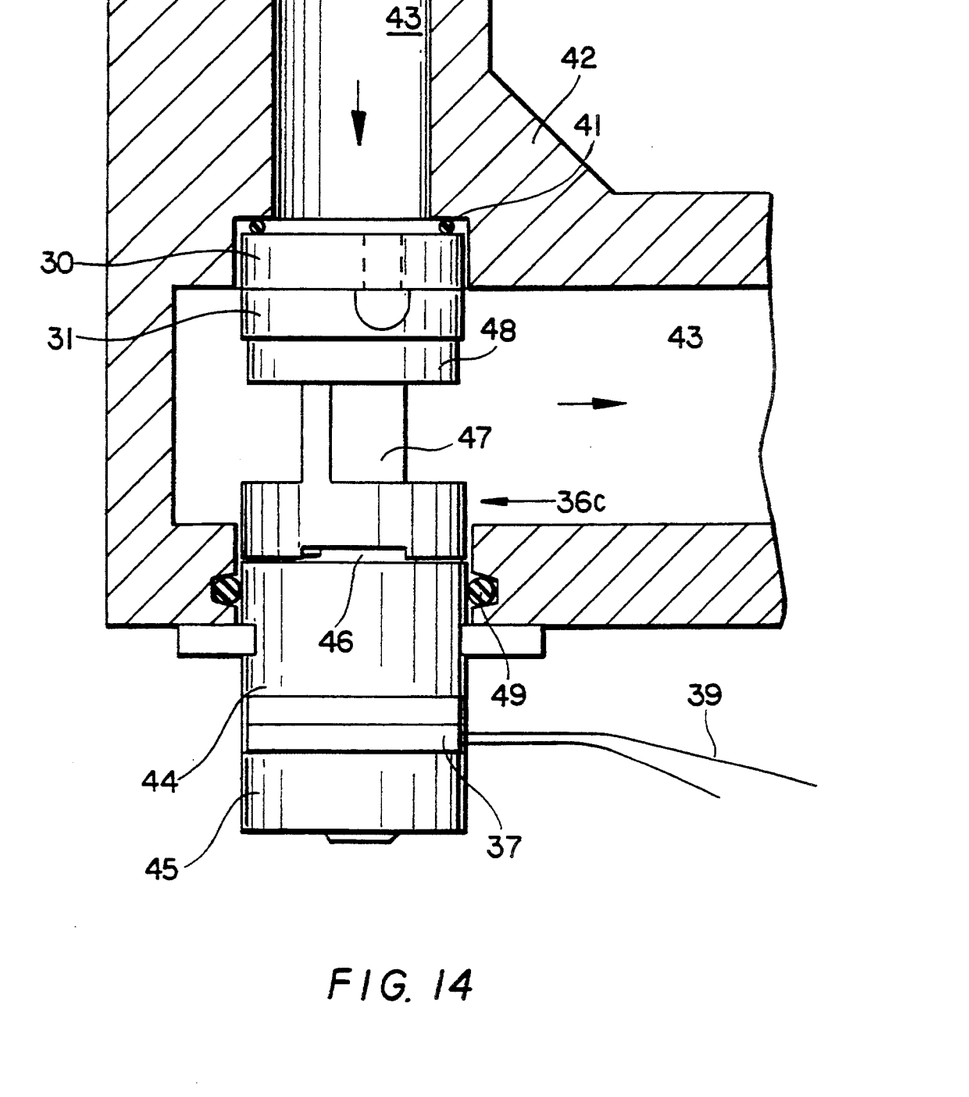
FIG. 14 shows another embodiment of the invention, in which the motor is different from the one of FIGS. 10–13.

FIG. 14 shows an application, in which an ultrasonic motor of a slightly different type is used. As to the construction of this motor, we refer to the cited EP patent application 86 102 249 9, publication nr 198 183. The motor comprises the piezoelectric elements 37, which are tightly pressed between the cylindrical aluminium pieces 44 and 45. Against the part 44 is also pressed an oscillating body 36c, which on one hand comprises a slot 46 and on the other hand the flat central part 47, the latter parts settling into different angles with regard to each other. The plate-like piece 48 is suspended against the central part 47. Of the plates 30 and 31 forming the valve assembly, the mobile plate 31 is attached to the straight piece 48. The oscillation of the part 36c brings the piece 48 into a rotatory motion, whereby the flow-through opening formed by the plate assembly 30 and 31 varies.

In this case, the valve is placed in the canal 43 formed by the angle of the valve body 42 and the assembly is sealed with regard to the body with O-rings 41 and 49. The opening in the mobile plate 31 opens into the edge of the plate.

Figure 15:
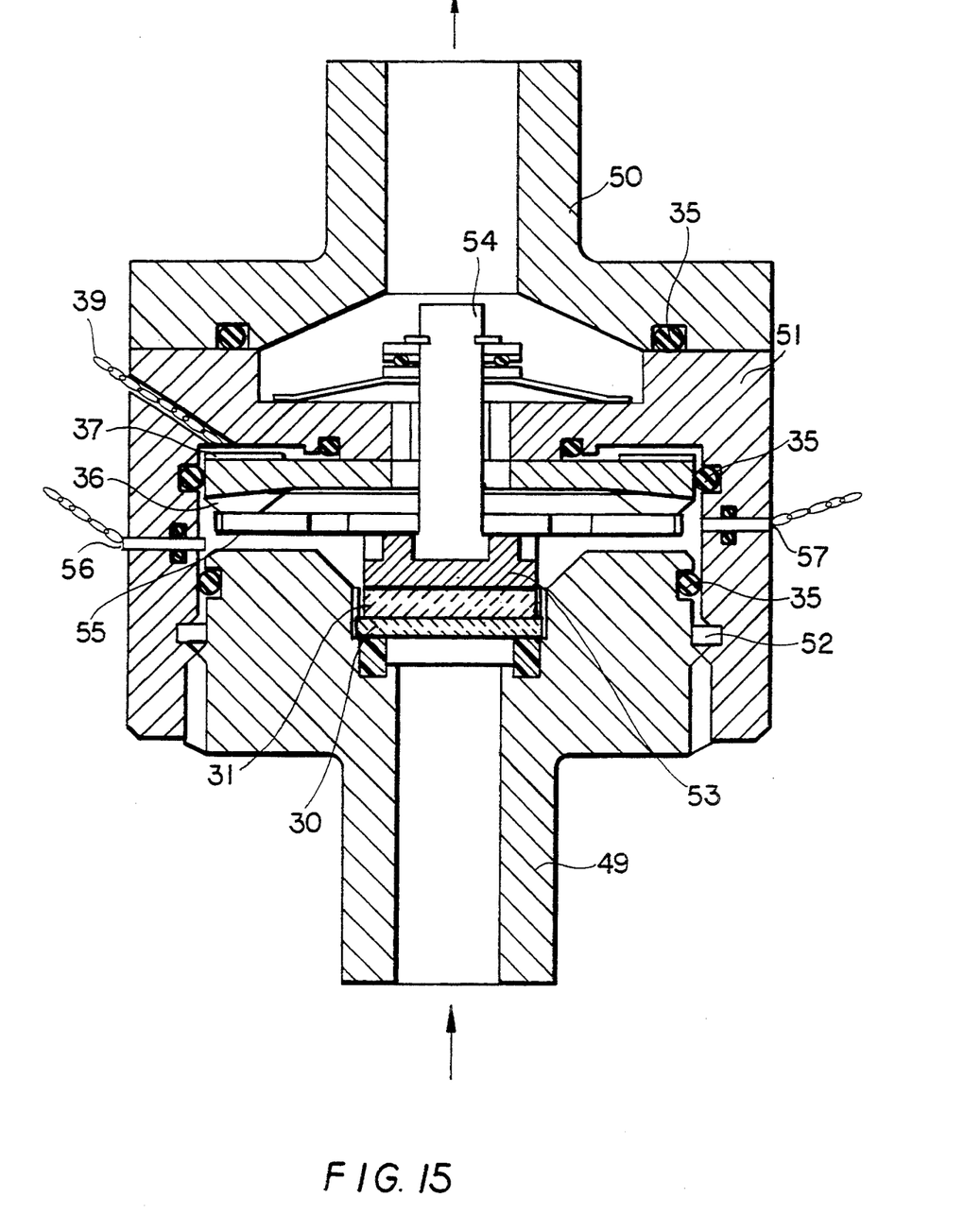
FIG. 15 shows a further optional embodiment of the invention.

Finally FIG. 15 shows a solution in which the rotor of the ultrasonic motor is disposed entirely in a water space.

Here the valve chamber consists of the parts 49 and 50 as well as 51, the parts 50 and 51 being joined by screws for instance, and subsequently the unit has been connected to the part 49 by a locking ring 52.

The shaft 54 that is elastically pressed upwards comprises the rotor 55 of the ultrasonic motor, which rotates the valve disc 31 with the intermediation of the part 53.

The position sensor 57 of the rotor on the one hand and the pressure sensor 56 on the other hand are disposed in the part 51 surrounding the water flowing space.

The embodiment described above can of course be varied in many ways within the scope of the inventive idea and the following claims.

We claim:
1. A control valve comprising:
   a rotating valve member, rotation of said valve member being effected by a rotor of an ultrasonic motor, said valve member being said rotor of said ultrasonic motor;
   a cylindrical housing having a longitudinal axis, a proximal end, a distal end and an internal wall;
   a plate fixed in said cylindrical housing, said plate having a top and a first hole, said top being relatively perpendicular to said longitudinal axis;
   an ultrasonic motor constructed concentric to said internal wall comprising:
   (a) said valve member being within said cylindrical housing, said valve member having a bottom and a second hole, said bottom contacting said top of said plate forming a water-tight seal therebetween, said valve member being rotatable with respect to said plate and, said second hole rotatably aligning with said first hole;
   (b) an oscillating body, said body being in vibrational contact with said valve member; and,
   (c) a piezo-electric element, said element being in vibrational contact with said oscillating body; and, control and supply means for supplying power to and controlling said ultrasonic motor.

2. The control valve of claim 1, wherein said plate and said valve member are ceramic.

3. The control valve of 1, said distal end being connected to a cylindrical pipe having a diameter which is smaller than the diameter of said cylindrical housing, said connection forming a shoulder within said housing, said proximal end having means for connecting said housing to a second cylindrical pipe.

4. The control valve of 3, said plate and said ultrasonic motor being disposed within said wall and held between said shoulder and said second pipe.

5. The valve according to claim 1, in which said plate is a rotating plate, the position of which determines the size of a pass-through opening of the valve, and including another rotating plate for an immediately attached part forming a counterpart of said ultrasonic motor, which is pressed by means of said piezo-electric element against said oscillating body brought into oscillation; and said oscillating body of said ultrasonic motor is annular, said annular oscillating body being placed to surround the flow.

6. The valve according to claim 5, in which said fixed plate together with said valve member are placed in a pipe having a broadening shaped as a shoulder, and said oscillating body being a ring piece of said ultrasonic motor placed on top of a shoulder inside said pipe.

* * * * *